United States Patent
Zou et al.

(10) Patent No.: US 11,199,296 B2
(45) Date of Patent: Dec. 14, 2021

(54) DRAG REDUCING AGENTS

(71) Applicants: Jian Zou, Sugar Land, TX (US); David J. Jurek, Katy, TX (US); Brandon M. Vittur, Sugar Land, TX (US); Anthony D. Bravo, Bixby, OK (US)

(72) Inventors: Jian Zou, Sugar Land, TX (US); David J. Jurek, Katy, TX (US); Brandon M. Vittur, Sugar Land, TX (US); Anthony D. Bravo, Bixby, OK (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 16/717,544

(22) Filed: Dec. 17, 2019

(65) Prior Publication Data
US 2020/0393087 A1    Dec. 17, 2020

Related U.S. Application Data

(60) Provisional application No. 62/861,598, filed on Jun. 14, 2019.

(51) Int. Cl.
*C08L 23/08* (2006.01)
*C08L 27/08* (2006.01)
(Continued)

(52) U.S. Cl.
CPC .............. *F17D 1/17* (2013.01); *C08L 25/06* (2013.01); *C08L 33/08* (2013.01); *C10G 71/00* (2013.01);
(Continued)

(58) Field of Classification Search
CPC . C10M 119/02; C10M 169/02; C10M 177/00
See application file for complete search history.

(56) References Cited

U.S. PATENT DOCUMENTS

| 4,340,076 A | 7/1982 | Weitzen |
| 4,518,757 A | 5/1985 | Schulz et al. |

(Continued)

FOREIGN PATENT DOCUMENTS

| CA | 2247100 C | 7/2007 |
| CN | 2603034 Y | 2/2004 |

(Continued)

OTHER PUBLICATIONS

International Search Report for International Application No. PCT/US2020/036958, International Filing Date Jun. 10, 2020, dated Sep. 23, 2020, 4 pages.

(Continued)

*Primary Examiner* — Vu A Nguyen
(74) *Attorney, Agent, or Firm* — Cantor Colburn LLP

(57) ABSTRACT

A drag reducing agent has a core comprising a polyolefin; and a temporary container encapsulating the core. The temporary container contains a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing. A largest dimension of the drag reducing agent is greater than about 1,000 microns.

20 Claims, 2 Drawing Sheets

(51) Int. Cl.

| | | |
|---|---|---|
| *C10M 177/00* | (2006.01) | |
| *F17D 1/16* | (2006.01) | |
| *F17D 1/17* | (2006.01) | |
| *C10L 1/16* | (2006.01) | |
| *C10L 1/197* | (2006.01) | |
| *C08L 25/06* | (2006.01) | |
| *C08L 33/08* | (2006.01) | |
| *C10L 1/196* | (2006.01) | |
| *C10G 71/00* | (2006.01) | |
| *C10M 101/02* | (2006.01) | |
| *C10M 169/02* | (2006.01) | |
| *C10N 50/00* | (2006.01) | |
| *C10N 70/00* | (2006.01) | |

(52) U.S. Cl.
CPC ............ *C10L 1/165* (2013.01); *C10L 1/1641* (2013.01); *C10L 1/1963* (2013.01); *C10L 1/1973* (2013.01); *C10M 101/025* (2013.01); *C10M 169/02* (2013.01); *C10M 177/00* (2013.01); *C08L 2207/53* (2013.01); *C09K 2208/28* (2013.01); *C10G 2400/10* (2013.01); *C10L 2250/04* (2013.01); *C10M 2201/02* (2013.01); *C10M 2203/003* (2013.01); *C10M 2205/022* (2013.01); *C10M 2205/183* (2013.01); *C10N 2050/12* (2020.05); *C10N 2070/00* (2013.01)

(56) References Cited

U.S. PATENT DOCUMENTS

| | | | |
|---|---|---|---|
| 4,720,397 | A | 1/1988 | O'Mara et al. |
| 5,126,070 | A | 6/1992 | Leifheit et al. |
| 5,323,906 | A | 6/1994 | Gouge et al. |
| 5,341,932 | A | 8/1994 | Chen et al. |
| 5,449,732 | A | 9/1995 | Smith et al. |
| 5,504,132 | A | 4/1996 | Smith et al. |
| 6,126,872 | A | 10/2000 | Kommareddi et al. |
| 6,160,036 | A | 12/2000 | Kommareddi et al. |
| 6,649,670 | B1 | 11/2003 | Harris et al. |
| 6,841,593 | B2 | 1/2005 | Kommareddi et al. |
| 6,946,500 | B2 | 9/2005 | Harris et al. |
| 7,119,132 | B2 * | 10/2006 | Harris ............... C08F 2/002 523/175 |
| 7,592,379 | B2 | 9/2009 | Liu et al. |
| 9,074,024 | B2 | 7/2015 | Nesyn et al. |
| 2002/0065352 | A1 | 5/2002 | Johnston et al. |
| 2003/0013783 | A1 * | 1/2003 | Kommareddi ........... B01J 13/22 523/175 |
| 2004/0132883 | A1 | 7/2004 | Harris et al. |
| 2008/0064785 | A1 | 3/2008 | Martin et al. |
| 2011/0319520 | A1 | 12/2011 | Mathew et al. |
| 2014/0238889 | A1 | 8/2014 | Sunder et al. |
| 2014/0356603 | A1 | 12/2014 | Kumar et al. |
| 2017/0156999 | A1 | 6/2017 | Harris et al. |
| 2019/0382511 | A1 | 12/2019 | Zou et al. |
| 2020/0392425 | A1 | 12/2020 | Vittur et al. |

FOREIGN PATENT DOCUMENTS

| | | | | |
|---|---|---|---|---|
| CN | 104214515 | A | 12/2014 | |
| CN | 107325379 | A | 11/2017 | |
| DE | 4244729 | A1 | 5/1994 | |
| EP | 1578804 | A1 | 9/2005 | |
| EP | 1358231 | B1 * | 8/2008 | ............ C08J 3/005 |
| JP | 0240254 | A | 2/1990 | |
| WO | 2017189322 | A1 | 11/2017 | |
| WO | 2017216827 | A1 | 12/2017 | |

OTHER PUBLICATIONS

Written Opinion for International Application No. PCT/US2020/036958, International Filing Date Jun. 10, 2020, dated Sep. 23, 2020, 5 pages.

Hartmann et al. "Water-Soluble Firls for Agrochemicals", Dec. 31, 2014; 4 pages, with English abstract.

M. A. Kelland, "Production Chemicals for the Oil and Gas Industry", 2nd edition, CRC Press, 2014, pp. 375-383.

Oberlerchner et al., "Overview of Methods for the Direct Molar Mass Determination of Cellulose"; Molecules 2015; 20, 10313-10341; www.mdpi.com/journal/molecules; 29 pages.

Yacob et al., "Determination of Viscosity-Average Molecular Weight of Chitosan Using Intrinsic Viscosity Measurement"; Malaysian Nuclear Agency, Bangi, 4 pages.

* cited by examiner

DRAG REDUCING AGENTS

CROSS REFERENCE TO RELATED APPLICATION

This application claims priority to U.S. Provisional Application No. 62/861,598, filed on Jun. 14, 2018, the content of which is incorporated hereby by reference in its entirety.

BACKGROUND

Drag reducing agents (DRAs) have been used to reduce the drag of fluids flowing through a conduit, and hence the energy required to transport such fluids. DRAs can also increase the flow capacity of pipelines.

Ultrahigh molecular weight, non-crystalline polyalpha-olefins are known drag reducing agents for hydrocarbons. These drag reducing agents are typically ground at the manufacturing facilities and then dispersed in a liquid carrier before being transported to injection sites, where DRAs are used. The reason is that without the liquid carrier, ground polyalpha-olefin particles can "cold flow" or agglomerate, and the agglomerated DRAs cannot dissolve or otherwise mix efficiently with hydrocarbons. Slurries of ground poly-alpha-olefins particulates, on the other hand, are stable formulations and can be easily pumped and injected into hydrocarbons. However, in the DRA slurries, the concentration of the active components, namely, polyalpha-olefins, is low, typically less than 20%; and it is common that more than 50% of the cost of the DRA products is associated with the material and transportation costs of the liquid carrier, which does not directly add to or improve drag reduction performance of polyalpha-olefins. Accordingly, there is a need in the art for drag reducing agents that can be conveniently and economically manufactured, stored, and transported with high polyalpha-olefin concentrations.

BRIEF DESCRIPTION

A drag reducing agent comprising: a core comprising a polyolefin; and a temporary container encapsulating the core, the temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; wherein a largest dimension of the drag reducing agent is greater than about 1,000 microns.

A process of manufacturing a drag reducing agent comprises injecting a catalyst and a drag reducing agent forming component comprising (i) at least one olefin monomer, or (ii) at least one olefin oligomer, or a combination of (i) and (ii) into a temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; sealing the temporary container; allowing the drag reducing additive forming component to polymerize in the sealed temporary container to form a core comprising a polyolefin; and deactivating the catalyst in the temporary container while the temporary container is sealed, wherein a largest dimension of the drag reducing agent is greater than about 1,000 microns.

BRIEF DESCRIPTION OF THE DRAWINGS

The following descriptions should not be considered limiting in any way. With reference to the accompanying drawings, like elements are numbered alike.

DETAILED DESCRIPTION

Applicants have found drag reducing agents that can be conveniently and economically manufactured, stored, and shipped. These drag reducing agents have a polyolefin core and a temporary container encompassing the core. With the protection of the temporary container, the drag reducing agents can be transported and stored in a solid, non-dispersion form, without any agglomeration issues associated with typical micron-sized ground drag reducing agent particulates. Further, the temporary container also serves as a reaction vessel, and polyolefin core can be formed within the temporary container. Once the polymerization reaction is completed, the polymerization catalyst is deactivated while the temporary container is still sealed. Advantageously, the material and construction of the temporary container are selected such that a deactivation agent can diffuse into the container to deactivate the polymerization catalyst while at the same time the integrity of the temporary container is maintained. The drag reducing agents have a largest dimension of greater than 1,000 microns. Once the drag reducing agents have been transported to a desired location such as an injection site, a pipe location, or a warehouse, the polyolefins can be released from the temporary container, ground, and used.

Figure 1:
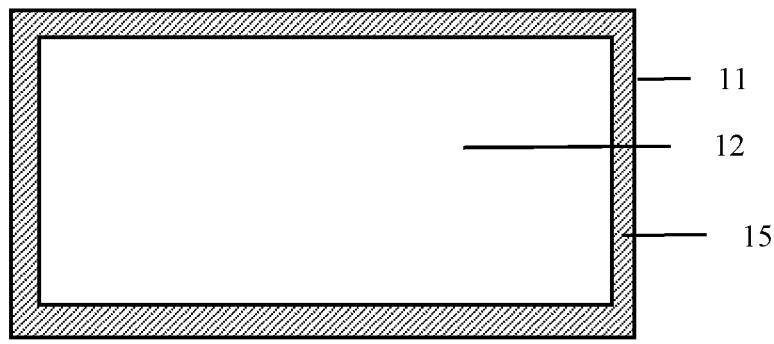
FIG. 1 illustrates a drag reducing agent having a core and a temporary container encapsulating the core.
Figure 2:
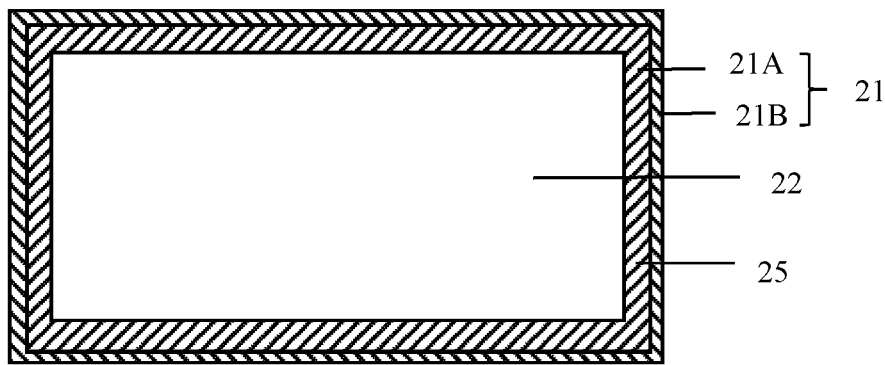
FIG. 2 illustrates a drag reducing agent having a core and a temporary container encapsulating the core, wherein the temporary container has two layers.
Figure 3:
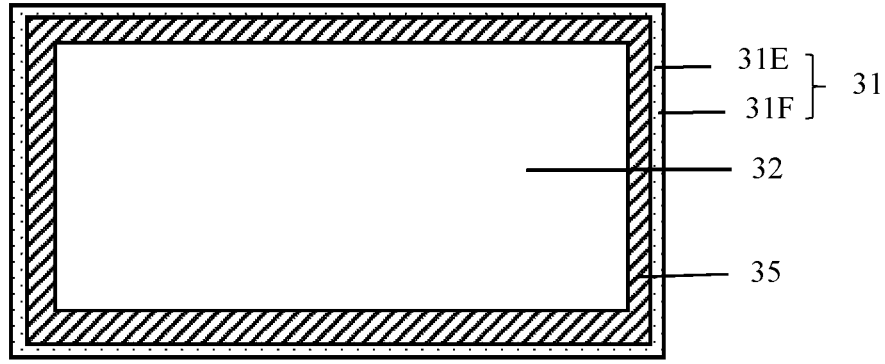
FIG. 3 illustrates a drag reducing agent having a core and a temporary container encapsulating the core, wherein the temporary container has a coating.
Figure 4:
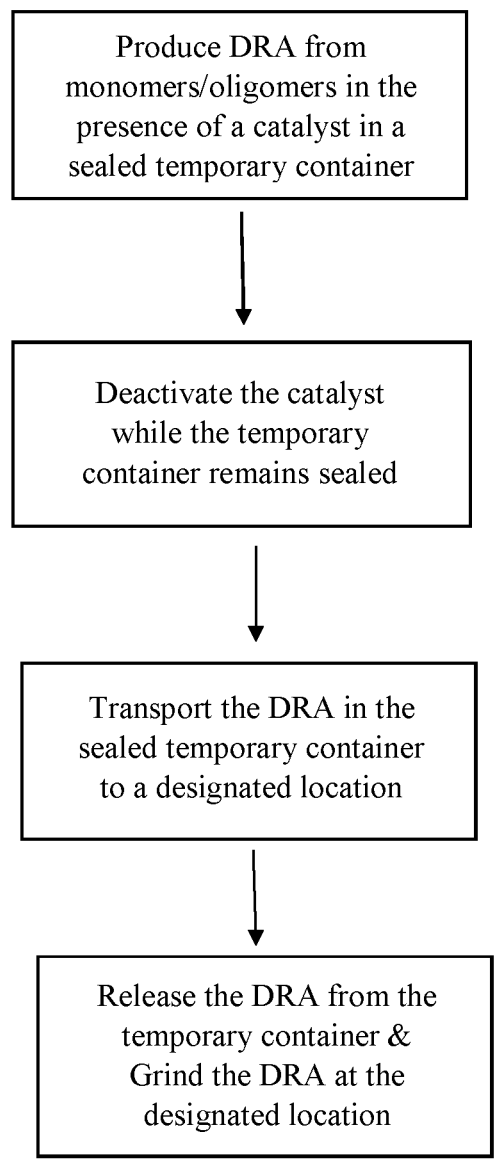
FIG. 4 is a process diagram illustrating a process of making and using a polyolefin drag reducing agent.

FIGS. 1-3 illustrate drag reducing agents (10, 20, 30) having a core (12, 22, 32) and a temporary container (11, 21, 31) encapsulating the core, the temporary container comprising a container material (15, 25, 35).

Suitable container materials are those that are dissolvable in water and/or solvent, and are capable of forming a film. Examples of container materials include an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene glycol, polyvinylidene chloride, a polysaccharide or its derivative, or a combination comprising at least one of the foregoing. Examples of polysaccharide and polysaccharide derivative include chitin, chitosan, chemically modified cellulose, and a chemically modified starch. As used herein, chemically modified cellulose and chemically modified starch refer to cellulose or starch which have been chemically treated such that the modified material is dissolvable in water and/or a polar solvent, and is capable of forming a film. Examples of chemically modified starch include starch acetate. Examples of chemically modified cellulose include cellulose acetate and cellulose triacetate. Polyethylene glycol is also known as polyethylene oxide (PEO) or olyoxyethylene (POE). As used herein, polyethylene glycol can have a molecular weight of up to 7,000,000. More than one container materials can be used. In an embodiment the container material comprise an ethylene vinyl alcohol copolymer. The copolymer can contain about 10 to about 80 mol % of the units derived from ethylene, and about 90 to about 20 mol % of units derived from vinyl alcohol. In a continuous process, the container materials can be provided as a continuous sheet, which is sealed by heat or adhesive to fabricate temporary containers of predetermined dimensions. The containers may have different shapes such as sphere, cylinder, rectangular cube, cube, tubes, and irregular shapes. Their largest dimension is greater than about 1,000 microns, preferably greater than about 0.5 centimeter, or about 0.5 centimeter to about 30 centimeters. In an embodiment, all dimensions of the temporary container are greater than about 1,000 microns, preferably greater than about 0.5 centimeter or greater than about 1 centimeter, or about 0.5 centimeter to about 30 centimeters.

The temporary container can have a single layered structure or a multi-layered structure. A single layer structure means that the temporary container has only one layer, and that layer is made from the container material as disclosed herein. A multi-layered structure means that the temporary container has two or more layers, wherein at least one layer is made from the container material as disclosed herein. Without wishing to be bound by theory, it is believed that when the temporary container is constructed with multiple layers of different materials, the dissolution of the container material can by fine-tuned.

Co-extrusion or other methods known in the art can be used to produce temporary containers having a multi-layered structure. In a temporary container having a multi-layered structure, the layer that faces the drag reducing agent or the reaction mixture used to form the drag reducing agent is referred to as an inner layer (21A), and the layer defines the exterior of the temporary container is referred to as an outer layer (21B). The layer that includes the container material as disclosed herein can be an inner layer or an outer layer of the temporary container. In an embodiment, each layer of the multi-layer structure independently comprises a container material as disclosed herein.

The temporary container can have a wall thickness of about 1 to about 2,000 microns, preferably about 1 micron to about 100 microns or about 10 to about 100 microns.

Optionally the temporary container can be coated with wax, a silicone, or a combination comprising at least one of the foregoing. The wax can be a natural wax or a synthetic wax. Examples of suitable naturally occurring wax materials include beeswax, candelilla wax, carnauba wax, ozokerite wax, ceresine wax, montan wax. Synthetic waxes include paraffin waxes, and polymers under the tradenames VYBAR™ and POLYWAX™ from Baker Hughes a GE company, LLC. As used herein, silicone includes silicone oils. In an embodiment, the silicone in the coating is polydimethylsiloxane (PDMS).

The coating (31F) can be disposed on an inner surface of the container, an outer surface of the container, or both the inner surface and the outer surface of the container. As used herein, an inner surface of the container means the surface that would otherwise be in direct physical contact with the drag reducing agent, or the reaction mixture to produce the drag reducing agent when the coating is not present. The outer surface (31E) refers to a surface that is opposed to the inner surface. The coating material can be sprayed onto the inner and/or outer surfaces of the temporary container in situ during a continuous process.

The core of the drag reducing agent can be formed from a drag reducing agent forming component including at least one olefin monomer, or at least one olefin oligomer, or a combination thereof. The olefin monomers can be alpha olefin monomers having a structure represented by Formula (I):

Formula (I)

wherein $R_1$ is a $C_{2-25}$ or $C_{4-20}$ alkyl group. Examples of the alpha olefin monomers include, but are not limited to, hexene, octene, decene, and tetradecene, or a combination comprising at least one of the foregoing. Olefin oligomers include oligomers derived from olefin monomers and can have a weight average molecular weight of less than about 5,000 Daltons or less than about 3,000 Daltons as determined by a gel permeation chromatography (GPC) method.

As used herein, polyolefins include copolymers. In an embodiment, the drag reducing agent forming components further include at least one styrene, a vinyl acetate, a vinylalkylene carboxylic ester having the Formula (II), an oligomer thereof, or a combination thereof:

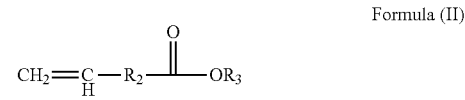

Formula (II)

wherein $R_1$ is as defined in Formula (I) and $R_2$ and $R_3$ are each independently a $C_{1-25}$ alkyl. The oligomer can have a weight average molecular weight of less than about 5,000 Daltons or less than about 3,000 Daltons as determined by a gel permeation chromatography (GPC) method. Thus the polyolefins can be a copolymer comprising units derived from olefin monomers of formula (I), and/or olefin oligomer thereof, as well as units derived from at least one styrene, a vinylalkylene carboxylic ester having the Formula (II), an oligomer thereof, or a combination thereof.

In an embodiment, a polyolefin drag reducing agent is synthesized via a bulk polymerization process from the drag reducing agent forming components in the presence of a polymerization catalyst. As used herein, a bulk polymerization refers to a polymerization reaction that is carried out in the absence of any solvent or dispersant. After the polymerization, the drag reducing polymer has a chemical structure of Formula (III) or Formula (IV) with x ranging from about 50,000 to about 20,000,000 and y ranging from about 50,000 to about 20,000,000, $R_1$ is as defined in Formula (I), $R_2$ and $R_3$ are each independently a $C_{1-25}$ alkyl, and each R4 is independently a phenyl group or an acetate group (—OC(=O)CH$_3$). The ratio of y to x can be from about 0.0001 to about 0.99, preferably from about 0.0001 to 0.2:

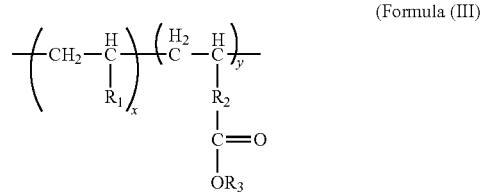

(Formula III)

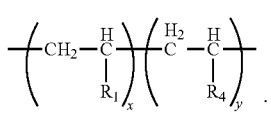

Formula (IV)

Polymerization catalysts that can be used include Ziegler-Natta catalysts as described in U.S. Pat. No. 6,649,670. Exemplary catalysts include, but are not necessarily limited to, aluminum activated titanium trichloride (TiCl$_3$AA), diethylaluminum chloride (DEAC), diethylaluminum ethoxide (DEALE), triethyl aluminum chloride (TEAL), trimethyl aluminum, tri-isobutyl aluminum, methylaluminoxane (MAO) and the like. Co-catalysts known in the art can also be used. The core of the drag reducing agents include deactivated catalyst in addition to polyolefins.

The polyolefin core can be present in an amount of about 80 wt % to about 99.99 wt %, preferably about 90 wt % to about 99.5 wt %, more preferably about 95 wt % to about 99.5 wt % or about 98 wt % to about 99.5 wt %, based on the total weight of the drag reducing agents. The largest dimension of the drag reducing agents is greater than about 1,000 microns or greater than about 2,000 microns, preferably greater than about 0.5 centimeter, greater than about 1 centimeter, or about 0.5 centimeter to about 30 centimeters. In an embodiment, all the dimensions of the drag reducing agents are greater than about 1,000 microns or greater than 2,000 microns, preferably greater than about 0.5 centimeter, greater than about 1 centimeter, or about 0.5 centimeter to about 30 centimeters. The temporary container can fully encapsulate the core.

FIG. 5 is a process diagram showing an exemplary process of making and using a polyolefin drag reducing agent. During the process, the drag reducing agent forming components and polymerization catalysts can be injected into the temporary containers.

The catalysts and the drag reducing agent forming components can be premixed first then injected into the temporary containers. In an embodiment, the drag reducing agent forming components and the catalysts are charged into at least one or a series of continuous stirred tank reactors, where the monomers are allowed to at least partially react forming oligomers having an adequate molecular weight or viscosity before injected into the temporary containers. Alternatively the catalysts and the drag additive agent forming components are separately added to the temporary containers.

Once charged with the drag reducing agent forming components which contain monomers, oligomers, or a combination thereof and catalysts, the temporary containers are sealed. A "form, fill, and seal" packaging device can be used. For polymerization reactions that are sensitive to oxygen and/or moisture, the fill and seal can be conducted under an inert atmosphere. The temporary container can be sealed with methods known in the art. For example, the temporary container can be sealed with heat, pressure, and/or adhesive.

During the form, fill, and seal process to make containers, different compositions with different monomers, different monomer to monomer ratios, different catalysts, different catalyst to monomer ratios, and the like can be injected into different containers. With this process, drag reducing agents with different composition, molecular weight, and molecular weight distribution can be individually encapsulated in connecting containers. The drag reducing agents in the connecting containers can be selected such that they have synergistic effect on the drag reducing performance.

The sealed temporary containers are placed in an environment that is effective to remove the heat generated from the polymerization reaction. The environment can be an inert environment. Advantageously, the container material can be selected and constructed to be an excellent oxygen and/or moisture barrier such that oxygen and/or water moisture do not diffuse into the temporary containers while the olefin components are polymerized therein. Thus the environment does not necessarily have to be an inert environment, and oxygen and/or moisture can be present around the sealed temporary container during the polymerization reaction.

The environment can be a liquid bath comprising a heat transfer fluid. Heat transfer fluids can include a hydrocarbon such as an aromatic solvent, an alcohol, or a combination comprising at least one of the foregoing. Exemplary heat transfer fluids include toluene, xylene, propanol, octanol, glycol such as hexylene glycol and ethylene glycol, isoparaffinic hydrocarbons such as ISOPAR™ fluids available from ExxonMobil, other synthetic hydrocarbons such as THERMINOL™ D-12 heat transfer fluid and THERMINOL™ VLT heat transfer fluid available from EASTMAN, or a combination comprising at least one of the foregoing. Optionally the liquid bath is agitated or circulated to improve heat transfer efficiency.

Alternatively or in addition, the environment can include circulated gas such as circulated air, nitrogen, carbon dioxide, argon, and the like to improve heat transfer efficiency at −100° C. to 100° C., preferably, at −40° C. to 20° C.

The sealed temporary containers can be placed in a liquid bath or a circulated gas environment at −100° C. to 100° C. for 0.1 to 200 hours to allow the drag reducing agent forming components to polymerize. Preferably the sealed temporary containers are placed in an environment at about −40° C. to about 20° C. for about 1 hour to about 24 hours.

After the drag reducing agent forming components inside the temporary containers reach a certain conversion percent and/or the polymerization product reaches a certain conversion or a certain molecular weight, the polymerization catalysts within the temporary containers are deactivated. In an embodiment, greater than about 70 wt % or greater than about 80 wt % of the drag reducing agent forming components are polymerized. The desired weight average molecular weight of the polymerized product can be greater than or equal to about 1,000,000 Daltons, for example, about 10,000,000 to about 30,000,000 Daltons. The molecular weight of the polymerized product is estimated by the inherent viscosity. Methods of estimating molecular weight with inherency viscosity are known and have been described in U.S. Pat. No. 5,449,732, and Production Chemicals for the Oil and Gas Industry (2$^{nd}$ Edition) by Malcolm A. Kelland.

Polymerization catalysts within the temporary contains can be deactivated while the temporary containers are still sealed. Deactivating the catalysts comprises allowing a deactivating agent to diffuse into the temporary container to deactivate the catalyst. The deactivating agent can include water, an alcohol, a phosphorous and sulfur-based material such as hydrogen sulfide, oxygen, or a combination comprising at least one of the foregoing. Advantageously, the material and construction of the temporary container are selected such that a deactivation agent can diffuse into the container to deactivate the polymerization catalyst while at the same time the integrity of the temporary container is maintained. Deactivating agent may be used at an elevated temperature, such as about 10° C. to about 300° C., preferably, at about 20° C. to about 80° C. Deactivating can also be accomplished by making an aperture on the temporary container to allow the deactivating agent to diffuse into the temporary container to deactivate the catalyst. A sharp object such as a needle, a blade, or a knife can be used to make the apertures. More than one aperture can be made. The size and number of the apertures can be tuned so that the temporary container maintains its structural integrity while allowing the catalyst be timely deactivated.

The deactivation can occur right after the desired molecular weight or conversion is achieved. Alternatively or in addition, the deactivation can occur during storage or shipping. For example, the drag reducing agents having a core and container structure can be stored and shipped with a deactivation agent such as water to deactivate the catalyst.

Once the drag reducing agents have been transported to a desired location such as an injection site, a pipe location, or a manufacturing facility close by, the temporary containers can be either fully or partially removed by at least dissolving the container material in a polar solvent or crude oil. Advantageously, the polar solvent only selectively dissolves the container material but not the polyolefin drag reducing agents. Exemplary polar solvents include methanol, ethanol, propanol, hexanol, octanol, hexylene glycol, and/or water, or a combination comprising at least one of the foregoing. Water can be in the form of steam. The polar solvent can also be mixed with the hydrocarbon such as crude oil and finished fuels. Crude oil may dissolve the temporary containers at ambient or elevated temperatures.

Optionally the container material is dissolved in the presence of an acid or base catalyst. Exemplary acid catalysts include acetic acid, p-toluenesulfonic acid, carbonic acid, $CO_2$, HCl, $H_2S$, $H_2SO_4$, $H_3PO_4$, or a combination comprising at least one of the foregoing. Exemplary base catalysts include NaOH, KOH, $Na_2CO_3$, $K_2CO_3$, ammonia, $NaHCO_3$, $KHCO_3$, or a combination comprising at least one of the foregoing. When an acid or base catalyst is used, the container material can be dissolved in a much faster rate. If desired, a rinse process with alcohols such as methanol, ethanol, propanol, hexanol, octanol, hexylene glycol, and/or water or a neutralization process can be used to remove the residual acid/base catalysts after the container material is dissolved. Any neutralization process known to a person skilled in the art can be used. For example, one can use an acid to neutralize a base and use a base to neutralize an acid.

As used herein, dissolving the container material includes decomposing the container material and dissolving the decomposed material in the polar solvent as disclosed herein or in hydrocarbons that contain the polar solvent, for example, crude oils, and finished fuels such as gasoline and diesel. One of the exemplary decomposing processes includes hydrolyzing the container material in water. Dissolving the container material also includes the embodiments where the container material is dissolved without degradation.

The temperature of the polar solvent used to dissolve the container material is not particularly limited, and can be about −100° C. to about 200° C. or about 20° C. to about 200° C.

The drag reducing agents are then ground forming particles before they are used. The container material is at least partially dissolved before grinding, during grinding, or after grinding with a polar solvent or a hydrocarbon containing the polar solvent. The ground DRAs can be added directly to hydrocarbon fluids such as crude oil and finished fuel to reduce drag. The ground DRAs can also be dispersed in a liquid carrier before injected into hydrocarbon fluids. The polar solvent and the dissolved container material can become a part of a dispersion or hydrocarbon suspending or dissolving the particulate drag reducing agent.

Optionally the core is separated from the polar solvent after the container material is dissolved. Alternatively, the core and the container are ground together, and the container material is removed during or after grinding.

Grinding can be conducted under cryogenic grinding conditions or non-cryogenic grinding conditions. The drag reducing agents can be ground under non-cryogenic grinding conditions. Solid and liquid grinding aids, such as those described in U.S. Pat. No. 6,946,500, can be used in a non-cryogenic grinding. In an embodiment, the container together with the polyolefin drag reducing agent are ground together in the presence of the polar solvent, optionally also in the presence of a base or acid catalyst. Thus, the container material can be at least partially dissolved in the polar solvent during grinding. The base or acid catalyst, if present, can be rinsed or neutralized. Advantageously, the polar solvent is not separated from the particulate drag reducing agent.

Set forth below are various embodiments of the disclosure.

Embodiment 1. A drag reducing agent comprising: a core comprising a polyolefin; and a temporary container encapsulating the core, the temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; wherein a largest dimension of the drag reducing agent is greater than about 1,000 microns.

Embodiment 2. The drag reducing agent as in any prior embodiment, wherein the core further comprises a deactivated polymerization catalyst.

Embodiment 3. The drag reducing agent as in any prior embodiment, wherein the largest dimension of the drag reducing agent is greater than about 0.5 centimeter.

Embodiment 4. The drag reducing agent as in any prior embodiment, wherein the largest dimension of the drag reducing agent is greater than about 0.5 centimeters to about 30 centimeters.

Embodiment 5. The drag reducing agent as in any prior embodiment, wherein the temporary container has two or more layers, and at least one layer comprises the container material.

Embodiment 6. The drag reducing agent as in any prior embodiment, wherein each of the two or more layers independently comprises the container material.

Embodiment 7. The drag reducing agent as in any prior embodiment, wherein the temporary container has an inner surface and an opposing outer surface, and a coating is disposed on at least one of the inner and outer surfaces of the temporary container, the coating comprising a wax, a silicone, or a combination comprising at least one of the foregoing.

Embodiment 8. The drag reducing agent as in any prior embodiment, wherein the temporary container has a thickness of about 1 to about 1,000 microns.

Embodiment 9. The drag reducing agent as in any prior embodiment, wherein the temporary container fully encapsulate the core.

Embodiment 10. The drag reducing agent as in any prior embodiment, wherein polyolefin is polymerized within the temporary container from a drag reducing agent forming component comprising (i) at least one olefin monomer, or (ii) at least one olefin oligomer, or a combination of (i) and (ii).

Embodiment 11. The drag reducing agent as in any prior embodiment, wherein the drag reducing agent forming component further comprises at least one styrene, a vinyl acetate, a vinylalkylene carboxylic ester, an oligomer of the vinylalkylene carboxylic ester, or a combination thereof.

Embodiment 12. The drag reducing agent as in any prior embodiment, wherein the polyolefin is present in an amount of about 80 wt % to about 99.99 wt %, based on the total weight of the drag reducing agent.

Embodiment 13. A composition comprising the drag reducing agent as in any prior embodiment.

Embodiment 14. The composition as in any prior embodiment, wherein the composition further comprises water.

Embodiment 15. A process of manufacturing a drag reducing agent, the process comprising: injecting a catalyst and a drag reducing agent forming component comprising (i) at least one olefin monomer, or (ii) at least one olefin oligomer, or a combination of (i) and (ii) into a temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing; sealing the temporary container; allowing the drag reducing additive forming component to polymerize in the sealed temporary container to form a core comprising a polyolefin; and deactivating the catalyst in the temporary container while the temporary container is sealed, wherein a largest dimension of the drag reducing agent is greater than about 1,000 microns.

Embodiment 16. The process as in any prior embodiment, wherein deactivating the catalyst comprises allowing a deactivating agent to diffuse into the temporary container to deactivate the catalyst, the deactivating agent comprising water, an alcohol, hydrogen sulfide, oxygen, or a combination comprising at least one of the foregoing.

Embodiment 17. The process as in any prior embodiment, wherein deactivating the catalyst comprises allowing water to diffuse into the temporary container.

Embodiment 18. The process as in any prior embodiment, further comprising making an aperture on the temporary container to allow water or oxygen to diffuse into the temporary container.

Embodiment 19. The process as in any prior embodiment, wherein the largest dimension of the drag reducing agent is more than about 0.5 centimeter.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A drag reducing agent comprising:
   a core comprising a polyolefin; and
   a temporary container encapsulating the core, the temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, polyvinylidene chloride, a polysaccharide or its derivative, or a combination comprising at least one of the foregoing;
   wherein a largest dimension of the drag reducing agent is greater than about 1,000 microns.

2. The drag reducing agent of claim 1, wherein the core further comprises a deactivated polymerization catalyst.

3. The drag reducing agent of claim 1, wherein the largest dimension of the drag reducing agent is greater than about 0.5 centimeter.

4. The drag reducing agent of claim 1, wherein the largest dimension of the drag reducing agent is greater than about 1 centimeter to about 30 centimeters.

5. The drag reducing agent of claim 1, wherein the temporary container has two or more layers, and at least one layer comprises the container material.

6. The drag reducing agent of claim 5, wherein each of the two or more layers independently comprises the container material.

7. The drag reducing agent of claim 1, wherein the temporary container has an inner surface and an opposing outer surface, and a coating is disposed on at least one of the inner and outer surfaces of the temporary container, the coating comprising a wax, a silicone, or a combination comprising at least one of the foregoing.

8. The drag reducing agent of claim 1, wherein the temporary container has a thickness of about 1 to about 1,000 microns.

9. The drag reducing agent of claim 1, wherein the temporary container fully encapsulates the core.

10. The drag reducing agent of claim 1, wherein the polyolefin is a copolymer of an olefin and a monomer comprising at least one of styrene, vinyl acetate, a vinylalkylene carboxylic ester, or an oligomer of the vinylalkylene carboxylic ester.

11. The drag reducing agent of claim 1, wherein the polyolefin is present in an amount of about 80 wt % to about 99.99 wt %, based on the total weight of the drag reducing agent.

12. A composition comprising the drag reducing agent of claim 1.

13. The composition of claim 12, wherein the composition further comprises water.

14. A process of manufacturing a drag reducing agent, the process comprising:
   injecting a catalyst and a drag reducing agent forming component comprising (i) at least one olefin monomer, or (ii) at least one olefin oligomer, or a combination of (i) and (ii) into a temporary container comprising a container material, which includes an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, polyvinylidene chloride, a polysaccharide or its derivative, or a combination comprising at least one of the foregoing;

sealing the temporary container;

allowing the drag reducing additive forming component to polymerize in the sealed temporary container to form a core comprising a polyolefin; and deactivating the catalyst in the temporary container while the temporary container is sealed, wherein a largest dimension of the drag reducing agent is greater than about 1,000 microns.

15. The method of claim 14, wherein deactivating the catalyst comprises allowing a deactivating agent to diffuse into the temporary container to deactivate the catalyst, the deactivating agent comprising water, an alcohol, hydrogen sulfide, oxygen, or a combination comprising at least one of the foregoing.

16. The method of claim 14, wherein deactivating the catalyst comprises allowing water to diffuse into the temporary container.

17. The method of claim 14, further comprising making an aperture on the temporary container to allow water or oxygen to diffuse into the temporary container.

18. The method of claim 14, wherein the largest dimension of the drag reducing agent is more than about 0.5 centimeter.

19. The drag reducing agent of claim 1, wherein the temporary container has a thickness of about 1 micron to about 100 microns.

20. The drag reducing agent of claim 1, wherein the temporary container has a thickness of about 10 microns to about 100 microns.

* * * * *